UNITED STATES PATENT OFFICE.

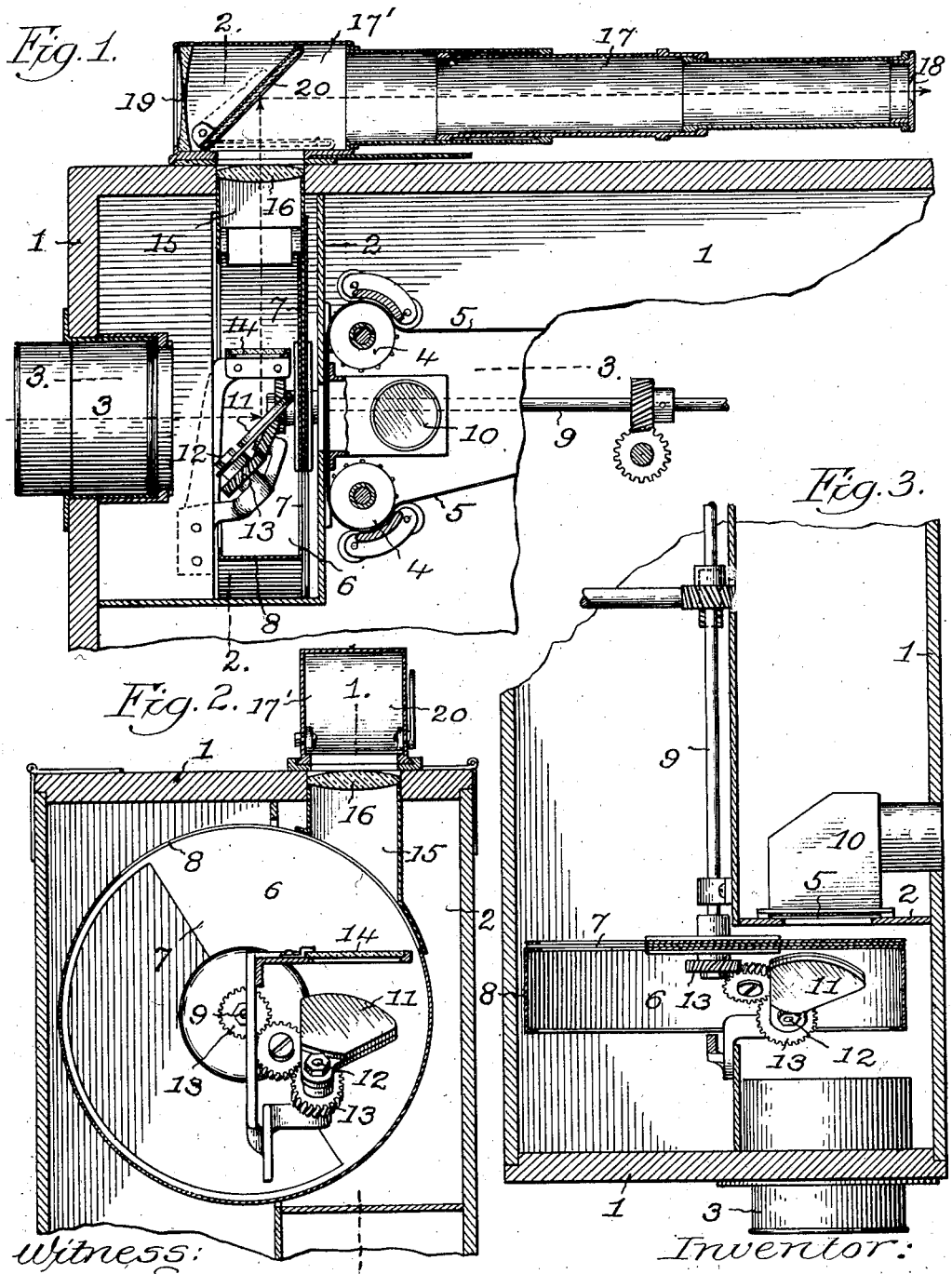

RUDOLF F. HLAVATY, OF CHICAGO, ILLINOIS, ASSIGNOR OF ONE-HALF TO JOSEPH KANTA, OF CHICAGO, ILLINOIS.

FINDING AND FOCUSING MEANS.

1,275,249.  Specification of Letters Patent.  Patented Aug. 13, 1918.

Application filed August 27, 1917.  Serial No. 188,303.

*To all whom it may concern:*

Be it known that I, RUDOLF F. HLAVATY, a native of Bohemia, and a resident of Chicago, in the county of Cook, State of Illinois, have invented certain new and useful Improvements in Finding and Focusing Means, of which the following is a specification.

This invention relates to that class of finding and focusing means for motion picture cameras, in which the lens system employed in taking the series of pictures is used in the production of the view or views in the focusing means of the camera, and the present improvement has for its object:—

To provide a simple and efficient structural formation and association of parts, whereby an alternating series of views are produced on the view screen of the focusing means during the ordinary operation of taking the usual series of pictures upon the moving picture film of the camera, without interference with such last mentioned operation, all as will hereinafter more fully appear.

In the accompanying drawings:—

Figure 1 is a longitudinal sectional elevation on line 1—1, Fig. 2, of a portion of a motion picture camera to which the present improvement is applied.

Fig. 2, is a transverse sectional elevation on line 2—2, Fig. 1.

Fig. 3, is a horizontal sectional elevation on line 3—3 Fig. 1.

Like reference numerals indicate like parts in the several views.

Referring to the drawing, 1 designates a portion of a camera casing of any usual and suitable form, provided with the usual fixed aperture plate or partition and with the usual objective housing 3, in which is mounted the lens system of the camera.

4 designates a film feeding mechanism of any usual construction, arranged at the rear of the aperture plate 2 and adapted to intermittently feed a picture film 5 past the light aperture of the plate 2, as usual.

6 designates a revoluble shutter arranged at the front of the aperture plate 2, and between the same and the objective housing 3, as usual. The shutter 6 preferably consists of a radial sector shape blade 7 controlling the light aperture of the plate 2, and an annular rim or skirt 8 formed with a light orifice or passage 8 controlling the passage of light to the finding and focusing means hereinafter described. And the arrangement is such that when the blade 7 is in position to permit passage of light to the picture film 5, the imperforate portion of the rim 8 will be in position to shut-off the passage of light rays from the objective 3 to the hereinafter described laterally disposed focusing means of the camera and effect a sharp and clear definition of the series of images on the ground glass screen of said focusing means. A further and material function of said orificed annular rim 8 is to prevent the passage of light rays through said focusing means to the sensitive film to cause "fogging" of the same.

9 designates the carrying shaft of the shutter 6 aforesaid, disposed longitudinally of the casing 1 and having the usual operative connection with the driving mechanism of the camera, to operate in unison with the other mechanism thereof.

10 designates the usual local finding device arranged at the rear of the light aperture of the plate 2 and adapted for use in the absence of the picture film 5 from the film feeding mechanism of the camera.

11 designates a revoluble reflector or mirror arranged in a plane at an angle of 45 to the optical axis of the lens system of the camera, and located between said lens system and the light aperture of the plate 2. The reflector 11 is preferably of a sector shape and extends laterally from its carrying shaft 12, which in turn is located at one side of the light aperture aforesaid; and so that in the revolution of the parts the reflector 11 will have a travel into and out of the light path of the camera, to alternately reflect the light to the finding and focusing means hereinafter described, and permit the passage of light to the picture film of the camera.

13 designate a train of spiral gear wheels operatively connecting the carrying shaft 12 of the reflector 11, with the carrying shaft 9 of the light shutter 6, so that the parts will operate in unison.

14 designates a flat screen or plate of ground glass or the like, arranged laterally of the light path of the camera, and upon which the picture will be reflected when the revolving reflector 11 is passing through said light path of the camera.

15 designates a light duct arranged tangential to the rim portion 8 of the light shutter 6 aforesaid, and having alined relation with the view screen 14 aforesaid.

16 designates a convex lens disposed in the upper end of the light duct 15 in adjacent relation to the adjustable reflector hereinafter described.

17 designates the view tube or duct of the present finding and focusing means, arranged longitudinally of the camera casing in right-angle relation to the light duct 15 and communicating therewith. The view tube 17 is preferably of the telescopic construction shown, so as to slide together into a small compass when not in use, and has at its rear end the usual removable cap nut 18 formed with a central view orifice, and at its forward end is provided with a concave lens 19. The described construction constitutes the finding means of the camera.

20 designates a hinged reflector arranged in an enlarged portion or chamber 17' of the view tube or duct 17, and disposed normally at an angle of 45 to the longitudinal axis of said tube and located in alined relation to the light duct 15 aforesaid so as to deflect the light passing through the duct 15 toward the view orifice of the cap 18 of the view tube 17. In the preferred construction shown, the reflector 20 is pivoted at its lower and forward end, so that it may be turned down into a horizontal position, when it is desired to use the structure as a view finding means, or when it is desired to close communication between the light duct 15 and view tube 17, and prevent any passage of light from the view tube 17, through the light duct 15, to the sensitive film of the camera.

With the present invention, the series of pictures are alternately directed to the sensitive picture film 5, and to the focusing means just described, with a motion picture effect to the eye of the operator to aid in an accurate and effective focusing of the lens system of the camera.

Having thus fully described my said invention, what I claim as new and desire to secure by Letters Patent, is:—

1. In a motion picture camera, the combination of a casing, an objective, a film feeding mechanism, a primary shutter controlling the light to the film in said feeding mechanism, an inclined reflector having movement through the light passage of the camera and adapted to intermittently deflect the passing light in a lateral direction, a view screen adapted to receive the laterally deflected light, a secondary shutter controlling the passage of light to said view screen, and means for operating the inclined reflector and shutters in unison, substantially as set forth.

2. In a motion picture camera, the combination of a casing, an objective, a film feeding mechanism, a primary shutter controlling the light to the film in said feeding mechanism, an inclined reflector having movement through the light passage of the camera in a circular path through the light passage and adapted to intermittently deflect the passing light in a lateral direction, a view screen adapted to receive the laterally deflected light, a secondary shutter controlling the passage of light to said view screen, and means for operating the inclined reflector and shutters in unison, substantially as set forth.

3. In a motion picture camera, the combination of a casing, an objective, a film feeding mechanism, a primary shutter controlling the light to the film in said feeding mechanism, an inclined reflector having movement through the light passage of the camera and adapted to intermittently deflect the passing light in a lateral direction, a view screen adapted to receive the laterally deflected light, a secondary shutter controlling the passage of light to said view screen and comprising an orificed annular rim carried by the primary shutter, and means for operating the inclined reflector and shutters in unison, substantially as set forth.

4. In a motion picture camera, the combination of a casing, an objective, a film feeding mechanism, a primary shutter controlling the light to the film in said feeding mechanism, an inclined reflector of a sector shape having movement in a circular path through the light passage and adapted to intermittently deflect the passing light in a lateral direction, a view screen adapted to receive the laterally deflected light, a secondary shutter controlling the passage of light to said view screen, and means for operating the inclined reflector and shutters in unison, substantially as set forth.

5. In a motion picture camera, the combination of a casing, an objective, a light controlling shutter, a film feeding mechanism, an inclined reflector having movement through the light passage of the camera and adapted to intermittently deflect the passing light in a lateral direction, a view screen adapted to receive the laterally deflected light, a convex lens arranged beyond said view screen, a view tube arranged in right-angle relation to the axis of the convex lens aforesaid, a reflector hinged in said view tube and adapted in one position to close communication between the view tube and the light duct containing the aforesaid convex lens, and means for operating the first mentioned reflector and the shutters in unison, substantially as set forth.

6. In a motion picture camera, the combination of a casing, an objective, a light controlling shutter, a film feeding mechanism, an inclined reflector having movement through the light passage of the camera and adapted to intermittently deflect the passing light in a lateral direction, a view screen adapted to receive the laterally deflected light, a convex lens arranged beyond said view screen, a view tube having a concave lens at its forward end, a movable reflector arranged in said view tube in line with the convex lens aforesaid, and means for operating the shutter and inclined reflector in unison, substantially as set forth.

Signed at Chicago, Illinois, this 24th day of August, 1917.

RUDOLF F. HLAVATY.